United States Patent
Klatt et al.

(10) Patent No.: US 10,549,472 B2
(45) Date of Patent: Feb. 4, 2020

(54) HEAT DEVICE AND METHOD FOR THE THERMAL CONDITIONING OF PREFORMS PROVIDED FOR BLOW MOULDING

(71) Applicant: KHS CORPOPLAST GMBH, Hamburg (DE)

(72) Inventors: Dieter Klatt, Hamburg (DE); Rolf Baumgarte, Ahrensburg (DE); Jan Fabian Meyer, Hamburg (DE); Frank Lewin, Tangstedt (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 16/092,031

(22) PCT Filed: Apr. 7, 2017

(86) PCT No.: PCT/EP2017/000439
§ 371 (c)(1),
(2) Date: Oct. 8, 2018

(87) PCT Pub. No.: WO2017/178102
PCT Pub. Date: Oct. 19, 2017

(65) Prior Publication Data
US 2019/0091918 A1    Mar. 28, 2019

(30) Foreign Application Priority Data
Apr. 14, 2016    (DE) .................. 10 2016 004 405

(51) Int. Cl.
*B65G 47/84*    (2006.01)
*B65G 47/74*    (2006.01)
(Continued)

(52) U.S. Cl.
CPC .......... *B29C 49/6436* (2013.01); *B29C 49/12* (2013.01); *B29C 49/4205* (2013.01);
(Continued)

(58) Field of Classification Search
None
See application file for complete search history.

(56) References Cited

U.S. PATENT DOCUMENTS 3,632,713 A    1/1972    Seefluth
3,775,524 A    11/1973   Seefluth
(Continued)

FOREIGN PATENT DOCUMENTS

DE    2352926 A1    4/1975
DE    3314106       10/1984
(Continued)

*Primary Examiner* — Kavel Singh
(74) *Attorney, Agent, or Firm* — Rankin, Hill & Clark LLP (57) ABSTRACT

A heating device for the thermal conditioning of preforms made of a thermoplastic material at a temperature profile that is suitable for a blow molding, and a blow molding machine having such a heating device. The heating device includes a plurality of heating units arranged one behind another along a heating section. The preforms are transported on a transport path along the heating section and along the heating units. The heating section includes a first heating section portion provided with first heating units for the uniform heating of the preforms in their peripheral direction, and a second heating section portion provided with second heating units for the non-uniform heating of the preforms in their peripheral direction. A method for the thermal conditioning of preforms is also disclosed.

20 Claims, 8 Drawing Sheets

(51) Int. Cl.
  *B29C 49/64* (2006.01)
  *B29C 49/12* (2006.01)
  *B29C 49/42* (2006.01)
  *B29K 667/00* (2006.01)
  *B29L 31/00* (2006.01)
(52) U.S. Cl.
  CPC .... *B29C 49/6418* (2013.01); *B29K 2667/003* (2013.01); *B29L 2031/712* (2013.01)

(56) References Cited

U.S. PATENT DOCUMENTS

| | | | |
|---|---|---|---|
| 3,892,830 A | 7/1975 | Hudson et al. | |
| 3,950,459 A | 4/1976 | Seefluth | |
| 5,292,243 A | 3/1994 | Gibbemeyer | |
| 5,681,521 A | 10/1997 | Emmer et al. | |
| 5,853,775 A * | 12/1998 | Oas | B29C 49/4205 425/145 |
| 6,287,507 B1 | 9/2001 | Appel et al. | |
| 7,810,629 B2 * | 10/2010 | Kronseder | B65G 17/385 198/347.1 |
| 7,857,117 B2 * | 12/2010 | Menke | B65G 17/48 198/402 |
| 8,991,588 B2 * | 3/2015 | Lahogue | B65G 17/32 198/459.1 |
| 8,992,208 B2 * | 3/2015 | Linke | B29C 49/4205 198/803.13 |
| 2016/0318215 A1 * | 11/2016 | Lewin | B29C 35/0277 |
| 2018/0029283 A1 * | 2/2018 | Baumgarte | B29C 49/4205 |

FOREIGN PATENT DOCUMENTS

| | | |
|---|---|---|
| DE | 4212583 A1 | 10/1993 |
| DE | 4340291 A1 | 6/1995 |
| DE | 69401024 T2 | 5/1997 |
| DE | 19906438 A1 | 8/2000 |
| DE | 29916842 U1 | 11/2000 |
| DE | 102007016027 A1 | 10/2008 |
| EP | 0620099 B1 | 12/1996 |
| EP | 2848382 A1 | 3/2015 |
| WO | 9732713 A1 | 9/1997 |
| WO | 2010007159 A1 | 1/2010 |

* cited by examiner

HEAT DEVICE AND METHOD FOR THE THERMAL CONDITIONING OF PREFORMS PROVIDED FOR BLOW MOULDING

The invention relates to a heating device for the thermal conditioning of preforms provided for blow molding according to the preamble of claim 1 and a blow molding machine according to claim 13.

The invention furthermore relates to a method for the inhomogeneous heating of preforms according to the preamble of claim 14.

In general, it involves the field of preferential heating, i.e., the non-uniform heating of preforms in their peripheral direction. Such a non-uniform heating with greatly heated peripheral regions and with less intensely heated peripheral regions is employed, for example, when the preforms are supposed to be made into containers whose cross section deviates from a round circular shape. The deviation may involve, for example, the production of containers with oval cross section or those with triangular or rectangular cross section, for example.

During a shaping of containers by the action of blowing pressure, preforms of a thermoplastic material, such as preforms of PET (polyethylene terephthalate), are fed to various processing stations inside a blow molding machine. Typically, such a blow molding machine comprises a heating device as well as a blowing mechanism, where the previously heated preform is expanded by biaxial orienting into a container. The expansion occurs with the aid of compressed air, which is introduced into the preform to be expanded. The course of the process for such an expansion of the preform is explained in DE 43 40 291 A.

The fundamental layout of a blow molding station for shaping of containers is described in DE 42 12 583 A1. Possibilities for the heating of the preforms are explained in DE 23 52 926 A1.

Inside the blow molding device, the preforms as well as the blow-molded containers can be transported with the aid of various handling mechanism. The use of transport mandrels, on which the preforms are placed, has proved to work especially well. But the preforms may also be handled with other carrier mechanisms. The use of gripping tongs for the handling of preforms and the use of spreading mandrels, which can be inserted for support into a mouth region of the preform, are also among the available designs.

A handling of containers by using transfer wheels is described for example in DE 199 06 438 A1 for an arrangement of the transfer wheel between a blowing wheel and an output section.

The already explained handling of the preforms is done on the one hand during the so-called two-stage processes, in which the preforms are first produced in an injection molding process, then temporarily stored, and only afterwards heated with respect to their temperature and blow-molded into a container. On the other hand, an application occurs in the so-called one-stage processes, in which the preforms are appropriately heated and then expanded immediately after their injection molding production and a sufficient solidification.

As regards the blow molding station used, various embodiments are known. For blow molding stations which are arranged on rotating transport wheels, a folding open of the mold carriers in the manner of the pages of a book is often encountered. But it is also possible to use mold carriers which can move relative to each other or which are otherwise guided. In the case of stationary blow molding stations, which are especially suitable for using multiple mold nests for the molding of containers, typically plates arranged in parallel with each other are used as mold carriers.

The production of the aforementioned non-round containers is already described in U.S. Pat. No. 3,775,524. At first, a symmetrical heating of the preforms is done, and then the temperature is selectively increased in chosen regions. Other variants for the production of temperature profilings in the peripheral direction of the preform are likewise described in U.S. Pat. Nos. 3,632,713, 3,950,459, and 3,892,830. A temperature conditioning by selective shadowing is indicated in DE 33 14 106 A1. It is known from U.S. Pat. No. 5,292,243 how to subject two preforms to a temperature conditioning in the peripheral direction at the same time. In EP 0 620 099 B1 and the identical-content DE 694 01 024 T2, a compilation of known methods of the prior art for the temperature conditioning of preforms will be found.

Furthermore, it is known in the prior art how to first heat a preform in a first heating section of a heating device in the peripheral direction homogeneously, that is, uniformly, and then to create the desired temperature profile in a second heating section in the peripheral direction. Such a prior art is shown by WO 97/32713 with a stepwise operating rotation drive for the preforms. U.S. Pat. No. 5,853,775 discloses two heating sections with a likewise stepwise circulating transport chain with a plurality of chain links, carrying preforms, in the form of transport mandrels. In a first heating station there first occurs a homogeneous heating of the preforms and in a second heating station, situated opposite the first station, there occurs a non-uniform heating of the preforms in the peripheral direction. In the two heating stations, the preforms are rotated by means of only one chain associated with the particular heating station. DE 10 2007 016 027 A1 teaches a device for the preferential heating, in which a rotary movement of the preforms is generated by a profiled rod, which interacts with a gear wheel of the transport means, carrying the preform through the heating section and being connected with further transport means into a circulating transport chain. The profiled rod runs at a distance from the transport chain around the heating section and meshes with the gear wheel of the transport means. The profiled rod is driven with constant or variable circulating speed.

The methods and devices thus far available in the prior art are at times complicated in design, not very flexible in their use, and modification-intensive, if it is necessary to convert from the non-uniform heating of preforms back to a uniform heating of preforms, e.g., upon a change in the production.

The problem which the present invention proposes to solve is therefore to indicate an improved method of the kind mentioned in the introduction, which discloses the design possibility for preferential heating in simple manner and which is flexible in its uses.

This problem is solved by a method in which the heating occurs in a heating device comprising multiple heating units arranged behind one another along a heating section, wherein transport means guide the preforms on a transport path along the heating section and along the heating units. The transport means are connected in a chain-like manner to form a closed continuous transport chain. This may be a heating wheel or a chain led in any given base contour by deflecting wheels. The transport means, e.g., may be a transport mandrel, especially a transport mandrel clamping the mouth region of the preform on the inside, from which a preform is held hanging down. The transport means circulates in the heating device and takes up the preforms during one revolution, supports them on a transport path and hands off the heated preforms once again. However, transport means that also run into the blowing station are also known. In a first heating section of the heating device the preforms are subjected to a uniform heating in their peripheral direction under rotation of the preforms about their longitudinal axis. In a second heating section of the heating device a non-uniform heating of the preforms occurs in their peripheral direction (preferential heating). A rotary drive body, such as a gear wheel, is arranged on the transport means, engaging with a first engaging device, such as a mandrel rotary belt, that is driven and arranged such that it circulates at a distance to the transport chain in order to introduce a rotational movement thereof about a longitudinal axis of the transport means, wherein this first engaging device is brought into engagement with the rotary drive body in the region of the first heating section and is brought out of engagement with the rotary drive body in the region of the second heating section. According to the invention, a second engaging device that can be driven is arranged such that it circulates at a distance to the transport chain. This second engaging device is brought into engagement with the rotary drive body in the region of the second heating section and holds the rotary drive body rotationally fixed, in particular by being held at the same translation speed as the transport chain.

Advantageously, the second engaging device rotates the preform by a given angle about its longitudinal axis after a stopping of the rotary drive body and before releasing the engagement with the rotary drive body, this angle being in particular adjustable. This may be required in order to hand over the non-uniformly heated preform in a desired rotational positioning to the blow molding station.

Further advantageous embodiments of the invention are indicated in the following device claims, whose features when converted to method form may be used analogously for the described method, and which emerge from the detailed description for the figures.

A further problem of the present invention is to indicate improved heating devices of the kind mentioned above, which reveal the possibility of preferential heating in simple manner and may therefore be used in flexible manner.

This problem is solved according to the invention by heating devices for the thermal conditioning of preforms made of a thermoplastic material at a temperature profile that is suitable for a blow molding, wherein the heating device has multiple heating units arranged behind one another along a heating section. The heating device has multiple transport means for transporting the preforms on a transport path along the heating section and along the heating units. The transport means are connected in a chain-like manner to form a closed continuous transport chain. The chain may also be designed as a heating wheel, but in general the chain is led across deflecting wheels and spans any given base contour. A typical transport means is a transport mandrel, especially a mandrel clamping the mouth section of a preform, on which the preform is held hanging down. The transport means are designed to take up, hold, and pass off the preforms during a revolution of the chain, while it is also possible for the transport means to run along into the blowing station. The transport means have a rotary drive body, such as a gear wheel, that cooperates with a first engaging device, such as a mandrel rotary belt, that is driven and arranged such that it circulates at a distance to the transport chain in order to introduce a rotational movement thereof about a longitudinal axis of the transport means via engagement in the rotary drive body. The heating device has a first heating section with first heating units, typically being so-called heating boxes with heating elements or radiators arranged on one side of the transport path, opposite which on the other side of the transport path there are arranged reflectors, and the preforms are led in between them. In this first heating section there occurs a uniform heating of the preforms in their peripheral direction. The heating device has a second heating section with second heating units, typically being heating boxes with heating elements or radiators arranged opposite each other on both sides, in the middle of which the preforms are moved through. In this second heating section there occurs a non-uniform heating of the preforms in their peripheral direction (preferential heating), wherein the first engaging device is arranged in such a way that it is engaged with the rotary drive body in the region of the first heating section and is not engaged with the rotary drive body in the region of the second section. In the first heating section, the preforms are placed in rotation to make the heating uniform, especially in a continuous rotation. According to the invention, the heating device has a second engaging device that can be driven and is arranged such that it circulates at a distance to the transport chain. This second engaging device is arranged in such a way that it is engaged with the rotary drive body in the region of the second heating section and also has the translation speed of the transport chain. With the solutions according to the invention, the method and the device can be used equally for both heating modes, e.g., by switching the speed of the second engaging device from preferential heating to a uniform heating. Furthermore, benefits result in the design and the possibility of positioning the preform by yet another predetermined peripheral angle before the transfer to the blow molding station.

Further advantageous embodiments of the invention are indicated in the dependent claims or will emerge from the figures in conjunction with the description of the figures.

It is possible to equip the second engaging device with its own drive. This produces good flexibility in adjusting the rotational speed. But then a synchronization with the movement of the transport chain is then usually required. This may be dispensed with if the drive for the engaging device is picked off from the transport chain. For this, the second engaging device may advantageously have, e.g., at least one coupling element, which can travel for the motion coupling in coupling engagement with the transport means, especially under cam control. Such a coupling element could also be called a driver. In particular, for example, an associated driver may engage with each link of the transport chain, especially if the engaging device is likewise designed as a chain.

A preferred transport means are transport mandrels, especially designed as clamping mandrels insertable into the mouth section of the preforms. These transport or clamping mandrels do not present any obstacle to the heating and they facilitate the hand-off processes.

Although the rotary drive body may be designed at will, gear wheels have proven to be preferable, since a slip-free and low-wear engagement can occur, e.g., if the first engaging device is designed as a toothed belt.

A simple design of a transport chain comprises spaced apart deflecting wheels across which the chain is led. Preferably, the guidance is such as to form curved circulating sections in the area of the deflecting wheels and linear circulating sections in the areas lying in between. This has the advantage that the heating units can be arranged in the linear circulating sections, where simple movement patterns exist and/or it is easy to realize an engagement with the transport mandrel or in general with the transport means for driving the transport mandrel in rotation or for securing the transport mandrel.

Simple design relations exist if in the second engaging device is configured as a toothed belt. This is a preferred embodiment also in terms of the moving masses. In particular, it is preferable for this second engaging device to be arranged in a linear circulating section. As explained above, easily manageable movement patterns occur here.

For a possibly desirable rotating of the preform into a desired peripheral positioning, it has proven to be advantageous for the toothed belt forming the second engaging device to be led by a guide element for a partial circumference along a deflecting wheel of the transport chain and standing in engagement with the rotary drive body. In this partial circumference, the transport chain and the second engaging device run with different angular velocities on account of the different circulating radii, which can be exploited for a targeted rotation of the preform. It is especially preferable for the guide element to have a movable design. The idea is to move the guide element for an increase or a decrease in the mentioned partial circumference where an engagement still exists, in order to adjust the preform rotation achieved in this manner.

For high accuracy of movements and for controllability, it is preferable that the engagement of the second engaging device be cam controlled.

Out of all available variant embodiments of an engaging device, it has proven to be advantageous fora long-term stable applicability with low weight and good handling ability for the second engaging device to be designed, e.g., as a circulating engaging chain with multiple chain links in a row. Preferably each chain link has an engaging body which can move into an engagement position with a rotary drive body, especially an engaging body movable under cam control, and/or a coupling element or driver as explained further above.

In order to provide room for leading away the first engaging device from the transport chain, it has proven to be preferable for the engaging chain to consist of two chain units spaced apart in the vertical direction. These chain units are advantageously coupled in movement, and the first engaging device is led away from the transport chain between them.

Another preferred embodiment of an engaging device may be realized in that the engaging body is designed as a movable swivel lever with internal toothing. This swivel lever could, e.g., engage directly with the rotary drive body of the transport means. Preferably, however, this swivel lever drives a belt pulley meshing with the engaging body. Further preferably, the belt pulley is designed as a partial segment of a disk, i.e., as a disk segment. In order not to have to drive the belt pulley directly with the swivel lever, preferably this is done in particular via a pinion driven by the swivel lever, which is arranged in particular on a common shaft with the belt pulley.

In this way, a transmission ratio can also be realized.

The above described heating device may find use in particular in a blow molding machine. The term blow molding machine also encompasses machines in which a stretching of the preforms takes place, e.g., with a stretching rod, during the introducing of blowing gas or some other blowing medium for the blow-molding transformation.

In conjunction with the following figures, the invention shall be explained more closely, with the aid of sample embodiments. There are shown:

FIG. 1 A perspective representation of a blow molding station for making containers from preforms, FIG. 2 A longitudinal section through a blow mold, in which a preform is being stretched and expanded, FIG. 3 A sketch to illustrate a fundamental layout of a device for blow molding of containers, FIG. 4 A sketch for a first sample embodiment of the present invention in a top view, FIG. 5 A side view of a second sample embodiment of the invention, FIG. 6a, 6b Enlarged views of the sample embodiment of FIG. 5 in the engagement region of the second engaging device in the transport chain, FIG. 7 A detailed view of FIG. 4 in the area of the head wheel, FIG. 8 Perspective views of details of FIG. 7 in the area of the second heating section, and FIG. 9 Sectional views from above of the object in the left half of the picture of FIG. 8.

Figure 1:
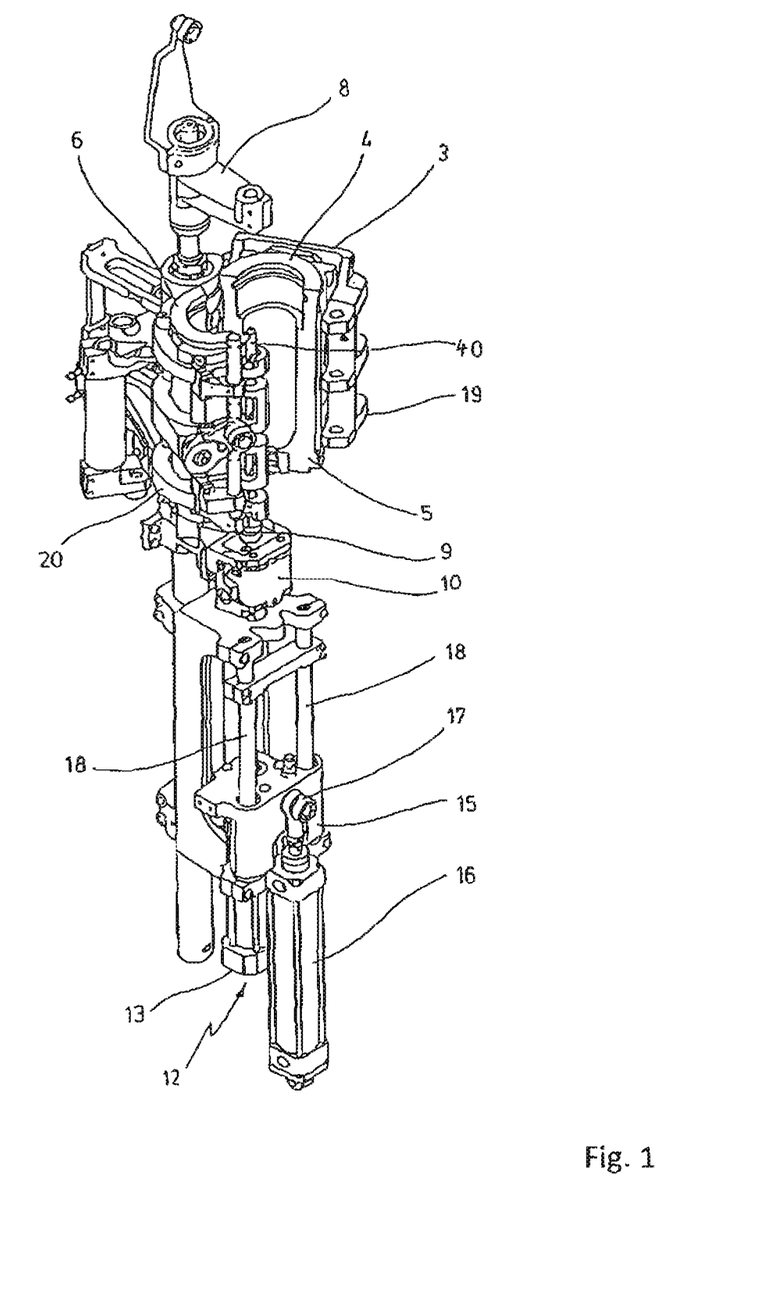
Figure 2:
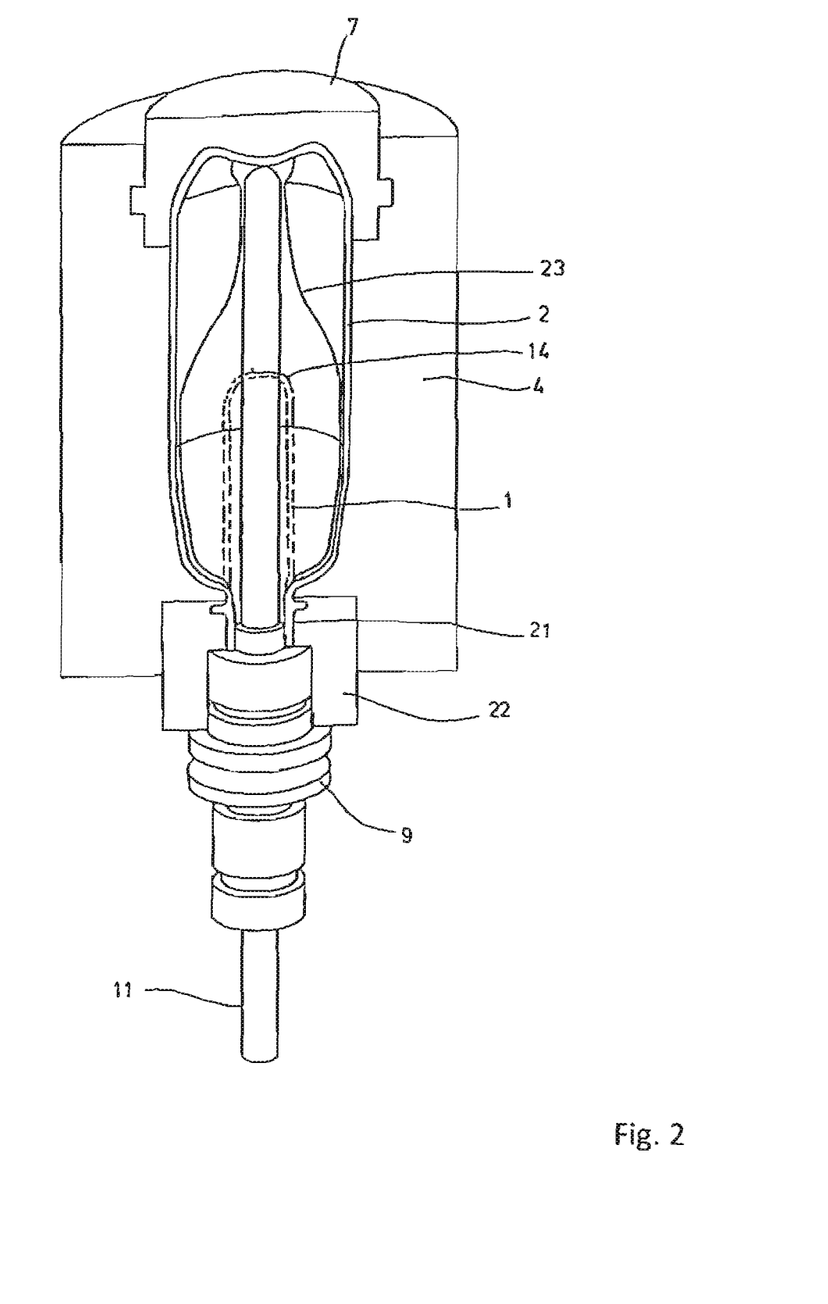

The basic layout of a device for shaping of preforms (1) into containers (2) is represented in FIGS. 1 and 2. With the help of these figures, the process of the blow molding of containers (2) from preforms (1) shall be explained only in basic manner. The device shown for the shaping of containers (2) consists essentially of a blow molding station (3), which is provided with a blow mold (4), in which a preform (1) can be placed. The preform (1) may be an injection molded piece of polyethylene terephthalate (PET). To make possible the inserting of the preform (1) in the blow mold (4) and to make possible a removal of the finished container (2), the blow mold (4) typically consists of mold halves (5, 6) and a bottom piece (7), which can be positioned by a lifting device (8), namely, in the present example, it can be raised and lowered. The preform (1) may be held in the area of the blow molding station (3) by a transport mandrel (9), which together with the preform (1) runs through a plurality of processing stations inside the device. But it is also possible to insert the preform (1) directly into the blow mold (4) with tongs or other handling means. In the example shown, the blow molding is done with preforms whose mouth faces downwards. Also customary are blow molding stations in which preforms are used with mouth facing upwards.

In order to make possible a supply of pressurized air, a connecting piston (10) is situated beneath the transport mandrel (9), which supplies pressurize air to the preform (1) and at the same time provides a seal against the transport mandrel (9). In one modified design, however, it is also fundamentally conceivable to use fixed pressurized air feed lines.

A stretching of the preform (1) is done in this sample embodiment with the aid of a stretching rod (11), which is positioned by a cylinder (12). According to another embodiment, a mechanical positioning of the stretching rod (11) is done by cam segments, operated by pickup rollers. The use of cam segments is especially expedient when a plurality of blow molding stations (3) are arranged on a rotating blowing wheel. Stretching rods with linear motor drive are also known in the prior art.

In the embodiment represented in FIG. 1, the stretching system is configured such that a tandem arrangement of two cylinders (12) is provided. By a primary cylinder (13), the stretching rod (11) is at first moved into the area of a bottom (14) of the preform (1) before the start of the actual stretching process. During the stretching proper, the primary cylinder (13) with extended stretching rod is positioned together with a carriage (15) carrying the primary cylinder (13) by a secondary cylinder (16) or by a cam control unit.

In particular, the idea is to employ the secondary cylinder (16) under cam control such that a current stretching position is dictated by a guide roller (17), which slides along a cam track during the performance of the stretching process. The guide roller (17) is pressed by the secondary cylinder (16) against the guideway. The carriage (15) slides along two guide elements (18).

After the closing of the mold halves (5, 6) situated in the area of carriers (19, 20), a locking of the carriers (19, 20) relative to each other is done with the aid of a locking mechanism (40).

For adapting to the different shapes of the mouth section (21) of the preform (1), separate threaded inserts (22) are used in the area of the blow mold (4), as shown in FIG. 2.

FIG. 2 also shows, in addition to the blow-molded container (2), the preform (1) in broken lines and schematically a container bubble (23) taking shape.

Figure 3:
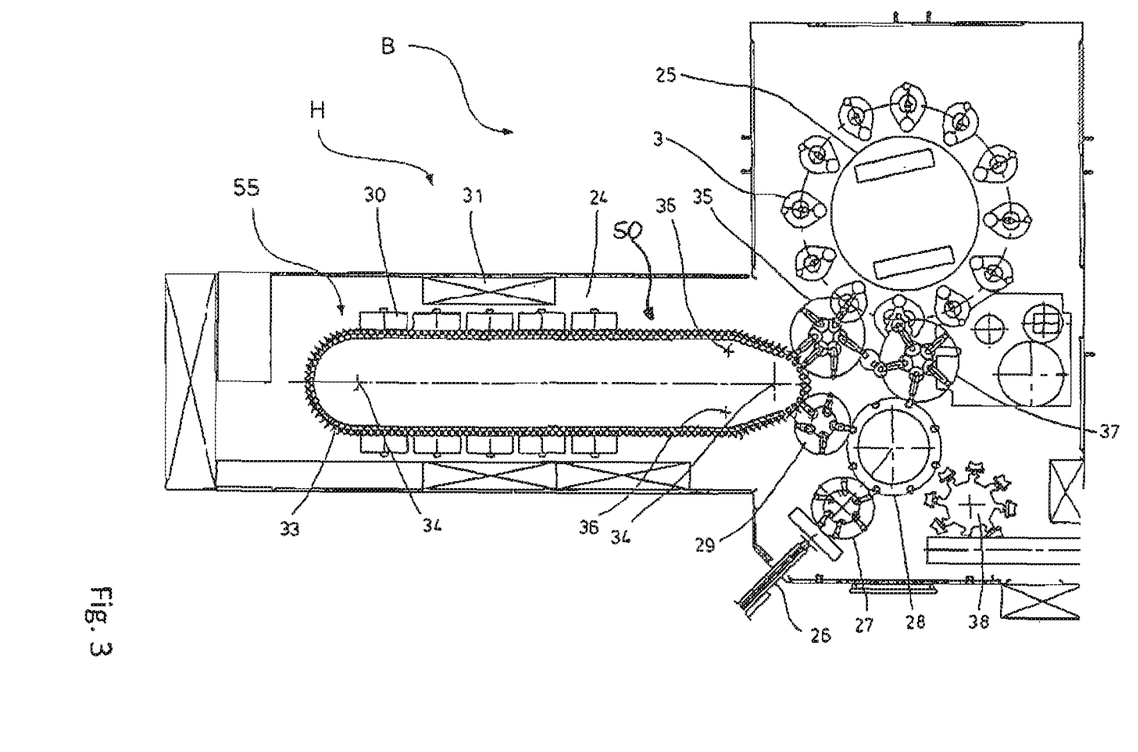

FIG. 3 shows, for a general understanding of the technical background of the invention, the basic layout of a blow molding machine (B), which is provided with a heating section (24) as well as a rotating blowing wheel (25). Starting from a preform entry (26), the preforms (1) are transported by transfer wheels (27, 2S, 29) into the region of the heating section (24). Along the heating section (24) there are arranged radiant heaters (30) as well as a blower (31), in order to heat the preforms (1). After a sufficient heating of the preforms (1), they are handed off to the blowing wheel (25), where the blow molding stations (3) are arranged, as explained for FIGS. 1 and 2. The final blow-molded containers (2) are taken by further transfer wheels to an output section (32).

In order to transform a preform (1) into a container (2) such that the container (2) has material properties which guarantee a long usage time for foodstuffs filled into the container (2), especially beverages, special process steps must be observed during the heating and orienting of the preform (1). Furthermore, advantageous effects can be achieved by obeying special dimensioning requirements.

The thermoplastic material used may be various plastics. For example, PET, PEN or PP can be used.

The expansion of the preform (1) during the orienting process is done by pressurized air feeding. The pressurized air feeding is divided into a preliminary blowing phase, during which gas such as pressurized air is supplied with a low pressure level, and a following main blowing phase, during which gas with a higher pressure level is supplied. During the preliminary blowing phase, pressurized air with a pressure in the range of 10 bar to 25 bar is typically used and during the main blowing phase pressurized air with a pressure in the range of 25 bar to 40 bar is supplied.

It can likewise be seen from FIG. 3 that the heating section (24) in the depicted embodiment is formed from a plurality of circulating transport elements (33), arranged in a row in chain fashion and guided along deflecting wheels (34). In particular, the idea is to span a substantially rectangular base contour by the chainlike arrangement. In the embodiment shown, a single relatively large dimensioned deflecting wheel (34), the head wheel, is used in the area of the extension of the heating section (24) facing the transfer wheel (29) and an entry wheel (35), with two relatively smaller dimensioned deflecting wheels (36) in the area of neighboring deflections. But basically any other guidances are also conceivable.

To enable the closest possible arrangement of the transfer wheel (29) and the entry wheel (35) relative to each other, the depicted arrangement has proved to be especially expedient, since in the area of the corresponding extension of the heating section (24) three deflecting wheels (34, 36) are positioned, namely, the smaller deflecting wheels (36) in the area of the crossing into the linear stretches of the heating section (24) and the larger deflecting wheel (34, head wheel) in the immediate transfer area to the transfer wheel (29) and to the entry wheel (35). Alternatively to the use of chainlike connected transport elements (33), it is also possible, for example, to use a rotating heating wheel.

After a completed blow molding of the containers (2), they are led out by a removal wheel (37) from the area of the blow molding stations (3) and transported via the transfer wheel (28) and an output wheel (38) to the output section (32).

The heating section (24) shown in FIG. 3 may be modified, e.g., by providing a larger number of radiant heaters (30), for example in order to heat a larger number of preforms (1) per unit of time. The blowers (31) may for example blow cooling air into the area of cooling air ducts, situated opposite associated radiant heaters (30), and delivering the cooling air through outlet openings. Thanks to the arrangement of the outflow directions, a flow direction for the cooling air can be realized substantially transversely to a transport direction of the preforms (1). The cooling air ducts may provide reflectors for the heating radiation in the area of surfaces situated opposite the radiant heaters (30); it is likewise possible to realize a cooling of the radiant heaters (30) by the delivered cooling air.

The above described radiant heaters (30) are likewise only to be understood as examples of heating units which can be used. Many alternative designs are known in the prior art, e.g., designs configured as heating wheels with single-place heating. Other heating methods are also known in the prior art, such as heating of the preforms by microwave radiation. The invention is independent of the specific appearance of the heating units and independent of the heating method.

Figure 4:
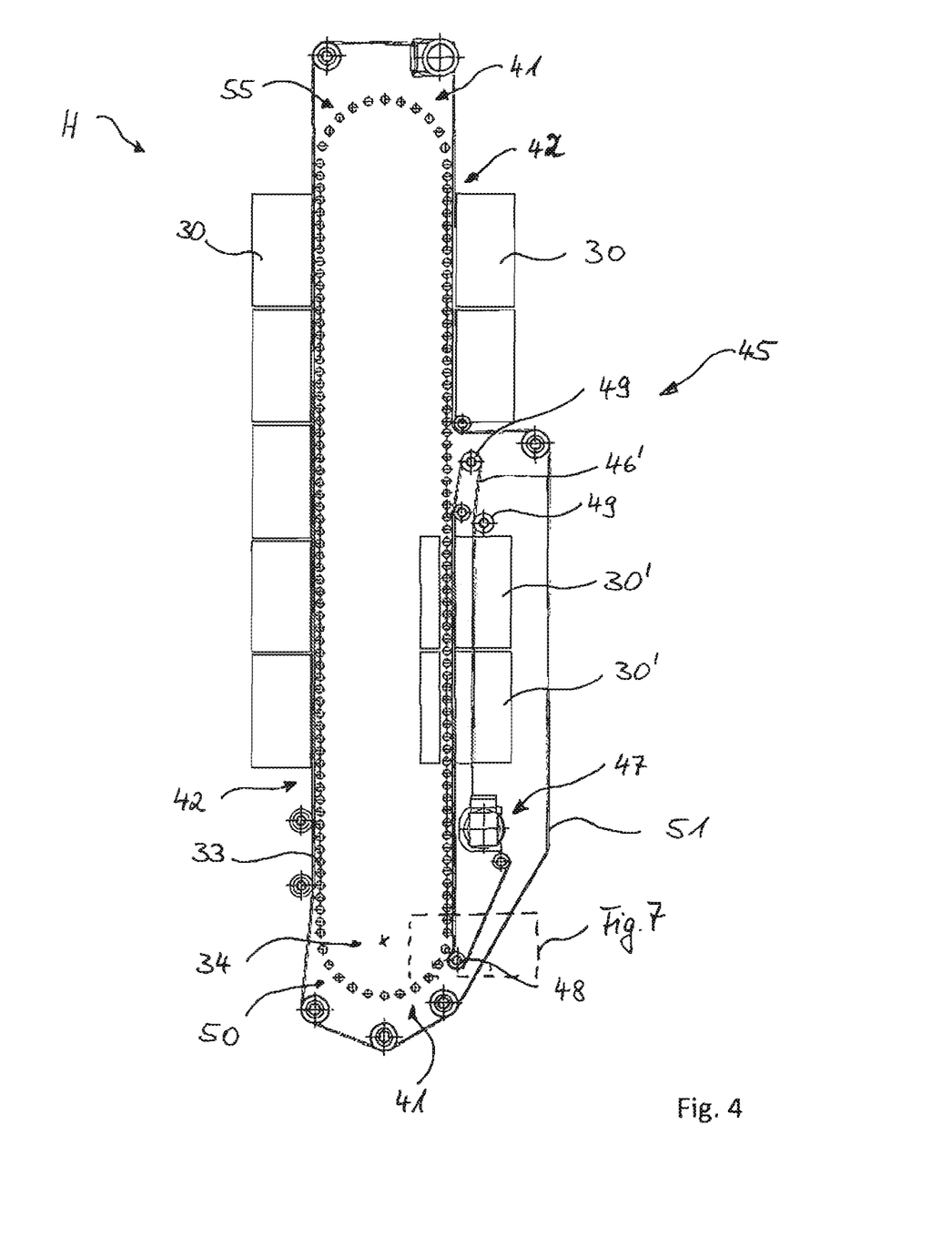

FIG. 4 shows in a top view, similar to the view in FIG. 3, a heating device (H) according to the invention. The circulating transport chain (50) composed of multiple transport means (33) is indicated by individual chain links (33). This chain (50) is deflected by deflecting wheels, not otherwise shown, and has a curved region (41) in the area of this deflection and linear regions (42) located in between. The preform entry into the heating device (H) occurs in the area of the head wheel, indicated by reference number (34). In the representation of FIG. 4, this head wheel (34) is situated at the bottom of the figure, while in the representation of FIG. 3 the head wheel is situated at the upper end of the heating device (H). FIG. 4 does not show the corresponding transfer wheels for handing off the preforms to the heating device (H) and for removing the heated preforms after a complete run through the heating device (H) by a nearly complete rotation cycle of the transport chain (50).

In the left linear region (42) in FIG. 4 there are provided multiple heating units (30). Typical heating units (30) are constructed for example as heating boxes, containing radiant heaters. Generally this heating unit (30) contains multiple substantially horizontally arranged straight heating pipes, emitting thermal radiation, and distributed along the length of the preform. These radiant heaters are generally situated on one side of the heating box and on an opposite side of the heating box there is generally arranged a reflector, designed with a high reflectivity for the thermal radiation used. In the space formed between the radiant heaters and the reflector, the preforms (1) are led through by the transport means (33). In this process, the preforms (1) are moved continually and rotated continually about their longitudinal axis, in order to assure the most uniform possible heating of the preforms (1).

In the axial direction of the preform (1) a uniform heating may likewise occur, But it is also possible for certain height regions of the preform (1) to be brought to a higher or lower temperature than other height regions. FIG. 4 shows at the left side of the figure five heating boxes arranged alongside each other, although this number may be chosen at will.

At the opposite situated linear region (42) of the heating section (24) there are likewise heating boxes (30, 30'). The two heating boxes (30) first moved through by the preforms (1) in this part of the heating section (24) are identical in design to the previously described heating boxes (30) for the uniform peripheral heating of the preforms (1). Next comes a gap, and another two heating boxes (30') in the direction of movement of the preform, required for the preferential heating, being different in their design from the previously described heating boxes (30). Here as well, multiple radiant heaters are typically arranged on a first side of the heating box (30'). On the opposite side of the heating box (30'), however, no reflector is arranged, but instead further radiant heaters, especially in the same manner as for the first side. This ensures that the preforms (1) led through these preferential heating boxes (30') are evenly heated on both sides, whereas the peripheral regions situated in front and behind in the movement direction receive less thermal radiation. In this way, a desired temperature profile can be created in the peripheral direction, namely, peripheral regions with higher temperature, namely, the peripheral regions facing the radiant heaters, and peripheral regions with lower temperature, namely, the peripheral regions of the preform (1) pointing in the movement direction and against the movement direction.

Figure 7:
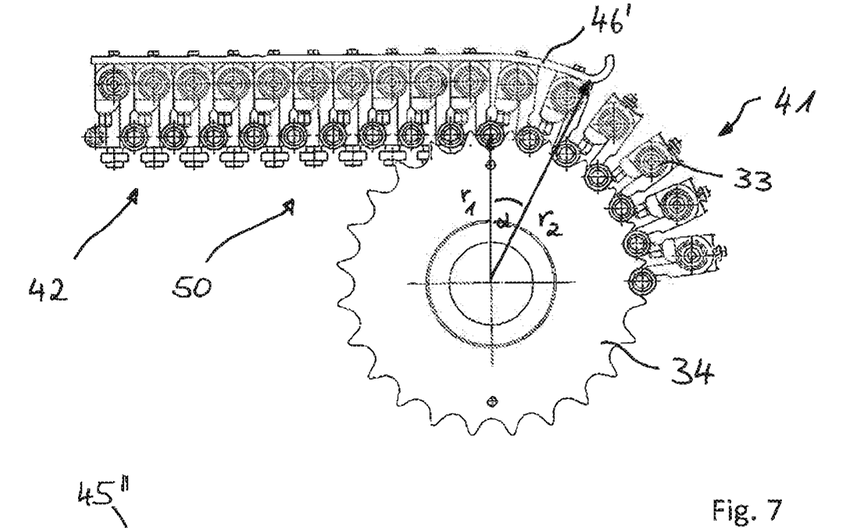

FIG. 4 furthermore shows the arrangement of a second engaging device (45), which in the sample embodiment depicted is designed as a circulating engaging belt (46'). The upper deflecting region (49) of the engaging belt (46') is located between the heating boxes (30) for the uniform heating of the preforms (1) and the heating boxes (30') for the preferential heating. For this purpose, for example, one insert position for a heating box is unoccupied. The one lower deflecting roller (48) for the engaging belt (46') is situated in the area of the head wheel (34). In particular, this deflecting roller (48) is designed such that the engaging belt (46') still follows the curved region (41) around the head wheel (34) for a portion. Furthermore, this deflecting roller (48) is movable, in particular, so that the engaging belt (46') follows the curved region (41) of the head wheel for a variable distance. Details on this are shown in FIG. 7 and will be explained further in connection with FIG. 7, especially the advantages associated with this.

The engaging belt (46') in the sample embodiment depicted has a belt drive (47). The engaging belt (46') is designed such that an engaging with the transport means (33) occurs such that no rotation about the longitudinal axis of the preform occurs when running through the heating boxes (30') designed for the preferential heating. For this purpose, it is provided for example that the engaging belt (46') runs at the same speed as the transport chain (50). For this, it is possible for example to have a synchronization between the transport chain (50) and the engaging belt (46'). But it would also be conceivable, for example, for the engaging belt (46') to not have any drive of its own, but instead to have a driver, for example, which engages with the transport chain (50) and is then carried along by the transport chain (50). In this way, the speed of the transport chain (50) and the engaging belt (46') is kept the same in simple manner.

FIG. 4 furthermore shows a so-called mandrel rotary belt (51), which ensures the uniform rotation of the preforms (1) about their longitudinal axis. This mandrel rotary belt (51) is led on the outside by the transport chain (50), in alternative variant embodiments it could also be led on the inside, and it runs at a slight distance in the linear regions (42) of the heating device (H) parallel to the transport chain (50). This mandrel rotary belt (51) runs completely around the transport chain (50) and is one example of a first claimed engaging device. Such a mandrel rotary belt (51) is already known in the prior art and it interacts for example with a gear wheel (52), arranged on the respective transport means (33) and rolling along the mandrel rotary belt (51). The rotational speed of the mandrel rotary belt (51) is chosen in relation to the rotational speed of the transport chain (50) such that a relative velocity exists, so that the transport means (33) carrying the preform (1) is placed in rotation by virtue of the rolling of the gear wheel (52) along the mandrel rotary belt (51).

In the area between the heating boxes (30) for the uniform heating and the heating boxes (30') for the preferential heating, this mandrel rotary belt (51) is Led away from the transport chain (50) and the mandrel rotary belt (51) is thus out of engagement with the gear wheels (52) of the transport means (33). This leading away is intended for the second engaging device (45) to engage with the gear wheel (52), without the mandrel rotary belt (51) presenting an obstacle. For this, the mandrel rotary belt (51) is led on the outside around the second engaging device (45) and around its deflecting and guide rollers (48, 49). Outside of the area of the heating boxes (30') for the preferential heating and after the engaging belt (46') is led back for a closed circulation, the mandrel rotary belt (51) again comes closer to the transport chain (50) and once again gets into engagement with the gears (52) of the transport means (33), designed for example as transport mandrels, in the left linear region (42) of the heating device (H).

The enlarged cutout of FIG. 4 that is shown in FIG. 7 reveals the engaging belt (46') in its extension in the area of the head wheel (34). In the left linear region, the engaging belt (46'), such as a toothed belt, is in engagement with the gear wheel (52) of the transport mandrels of the transport chain (50), while transport means (33) other than transport mandrels could also form the chain links of the transport chain (50). This engagement is continued into a curved region (41) of the transport chain (50), namely, the engaging belt (46') runs along a partial circumference with a corresponding angle ($\alpha$) in this curved region around the head wheel (34) before the belt (46') is lifted up by the gear wheels (52) and begins its return run. In the linear region (42) the engaging belt (46') and the transport chain (50) are at the same speed, and thanks to the parallel arrangement of the two belt or chain stretches the preform (1) can be held in this way in a fixed circumferential angle position. But as soon as the curved region (41) commences, the transport chain (50) spreads open and the engaging belt (46') and the transport chain (50) run at different radii r1, r2 with different angular velocity. For this reason, a rotating of the transport means (33) and the preform (1) held by it occurs in this curved region (41) of the head wheel (34). The angle of rotation is dependent on the one hand on the ratio of the circumferential radii of the transport chain (50) and the engaging belt (46') and on the other hand on the angle ($\alpha$). By shifting that position in the curved region (41) where the engaging belt (46') is taken out of engagement with the gear wheel (52) of the transport mandrel (33), the rotating of the preform (1) or the transport mandrel (33) can be adjusted specifically. For purposes of this adjustment, a deflecting means (48) of the engaging belt (46') is movable in this region (41), so as to specifically change the angle (α) shown in FIG. 6. The deliberate rotating of the preform (1) or the transport mandrel (33) is of particular advantage when the preform (1) needs to be placed in a definite orientation in the blow molding station (3), i.e., when the peripheral regions of the preform (1) held at higher temperature need to be placed in a definite relative position to the blow mold halves (5, 6), for example, in order to accomplish a non-round shape of the container. The adjusting of such a desired orientation of the preform (1) is assisted by the specific adjusting of the angle (α) in FIG. 7 by shifting a deflecting roller (48) of the engaging belt (46).

The engaging belt described with reference to FIGS. 4 and 7 could also be designed as an engaging chain, for example. This chain only needs to be led analogously to the engaging belt and engage with the engaging body or the gear wheel (52). Other engaging devices with the same functionality area also possible.

Figure 5:
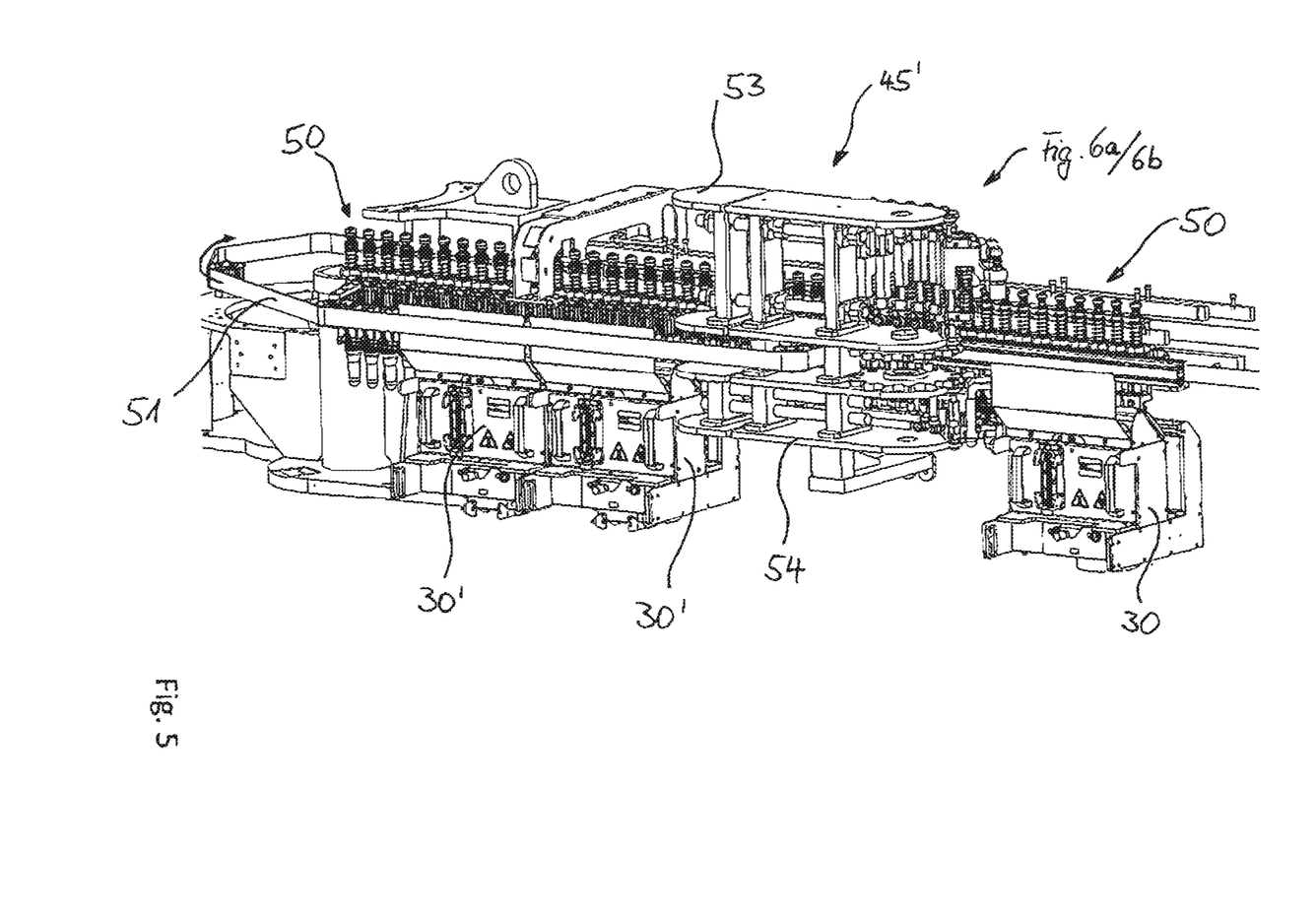

One example of an engaging chain having a much more complex structure as compared to the aforementioned engaging chain in the sample embodiment of FIGS. 4 and 7 and which may afford further functionalities shall be described below, where in a further modification of the above sample embodiment no belt/chain drive or in general no individual drive is provided for the engaging device, but instead the following sample embodiment calls for an entraining of the engaging device by the conveyor chain. This should also be considered to be a possibility which can be realized in the above sample embodiment. Vice versa, in each of the sample embodiments an individual drive for the engaging device may be provided instead of a driver or instead of an entraining engagement with the conveyor chain. FIG. 5 shows in a partial cutout and in a perspective side representation a second example of a second engaging device (45') according to the invention. This second engaging device (45') is designed substantially as a circulating chain with multiple chain links. The first engaging device (51) here as well is formed as a circulating toothed belt, namely, as a mandrel rotary belt. In the right front area of FIG. 5 there is shown a heating box (30), which provides the uniform heating of a preform (1) in the peripheral direction. In the left area of FIG. 5 are shown two heating boxes (30'), which are designed for the preferential heating. In the region in between, which has been left free by omitting one heating box for example, the second engaging device (45') is situated. This engaging device (45') consists of an upper component (53) and a lower component (54). Between these components (53, 54) the mandrel rotary belt (51) is led away from the transport chain (50) and runs on the outside along the heating box (30'). This deliberate bifurcation of the engaging device is purely optional and it allows the providing of further functions in this region of the heating device (H), for example. Such further functions might be, e.g., the performing of a sterilization by a sterilization device or, e.g., the providing of an inspection device. Regarding the sterilization device, refer e.g. to DE 10 2010 026 166 A1 and in particular to FIG. 5 there and the remarks on the benefits and the technical realization of a sterilization of preforms in the area of the heating section of a heating device. In a manner not shown, the upper component (53) and the lower component (54) of the second engaging device (45') are coupled in a coordinated circulating movement. It is also conceivable to provide both components (53, 54) with their own drives, which are coordinated in their operation, so as to accomplish a uniform and synchronized circulating movement. But it is also conceivable for only one of the two components (53, 54) to have a drive and for the other component to be driven along by a motion coupling, for example. But it is also possible for one or both components to engage with the transport chain (50) by means of drivers and to be carried along by the transport chain (50). This is shown as an example in FIGS. 6a and 6b. This variant embodiment has the advantage that the individual chain links of the engaging chain (45') automatically run at the same speed as the transport chain links. When the engaging elements (45') mesh with the gear wheel (52) of the transport mandrel (33) and at the given identical speed of the engaging device (45') and the transport mandrel (33), this has the effect that a rotation of the preform (1) about its longitudinal axis is prevented. Accordingly, the preform (1) can be led with a fixed orientation in the peripheral direction through the heating box (30') designed for the preferential heating. Since the mandrel rotary belt (51) is led in the area of the second engaging device (45') out of engagement with the transport mandrels (33), it is sufficient to terminate and halt the rotation of the mandrel in this area.

Basically it could also be provided, e.g., that the driver (44) comprises an engaging element, such as a locking member, which engages with the rotary drive body (52) of the transport mandrel (33) to prevent a rotation as soon as the driver (44) is brought into entraining engagement with the transport chain (50), e.g. under cam control. The locking members would then be moved with the drivers and be placed in engagement and out of engagement at the same time, for example. For this, however, the lifting of the mandrel rotary belt (51) shown in FIG. 6a would have to occur earlier than is represented there. It is also possible to arranged an engaging element of the engaging device (45') on each chain link, separate from the driver (44), but in analogous manner as shown for the driver (44), which is likewise brought into engagement and out of engagement with the rotary drive body (52) of the transport mandrel (33), e.g., also under earn control. This may then occur at a different time from the driver engagement with the conveyor chain (50). This would also make it possible to select a number of drivers (44) different from the number of engaging elements. There is no need for each chain link to have a driver; this is purely optional. It is only necessary to arranged a sufficient number of drivers along the chain length to ensure a continuous driving. But for this, 3 or 4 uniformly distributed drivers would be enough.

Figure 6A:
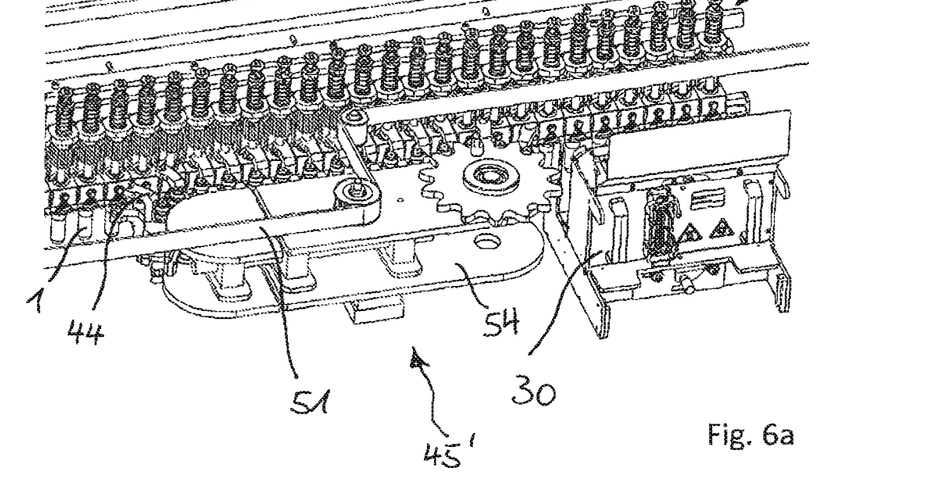
Figure 6B:
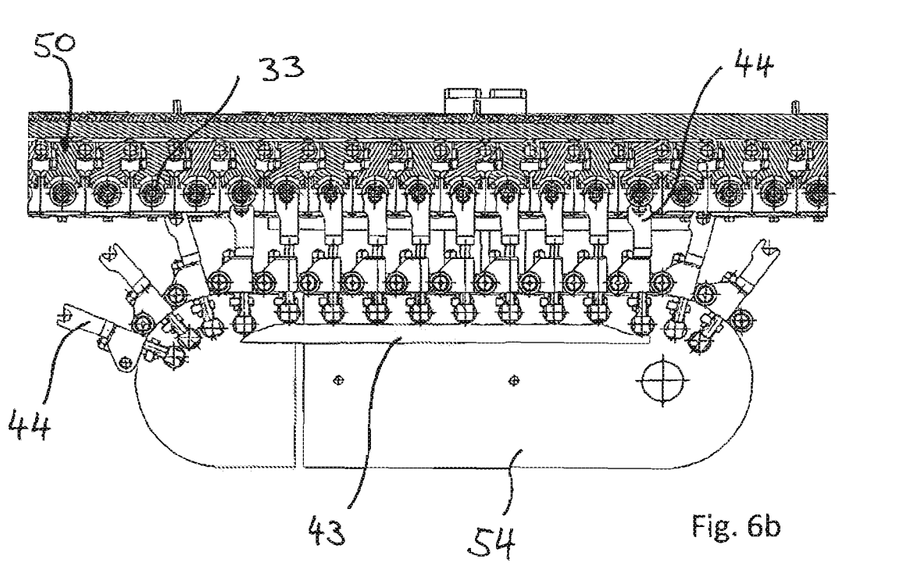

FIGS. 6a and 6b show, omitting the upper component, how the driver (44) discussed in the previous paragraph could be designed in a special embodiment. The lower chain unit (54) has drivers (44) which are movable in the radial direction, being held spring-loaded, e.g., in a radially inwardly pulled positioning. Upon reaching an external control cam (43), the drivers (44) are forced radially outward and come into dragged engagement with the transport means (33) of the transport chain. Such a solution is considered to be advantageous, since the drivers (44) cannot easily swivel into the linear moving transport chain (50). The engaging of the drivers (44) can only occur, e.g., in the linear circulating region (42).

Figure 8:
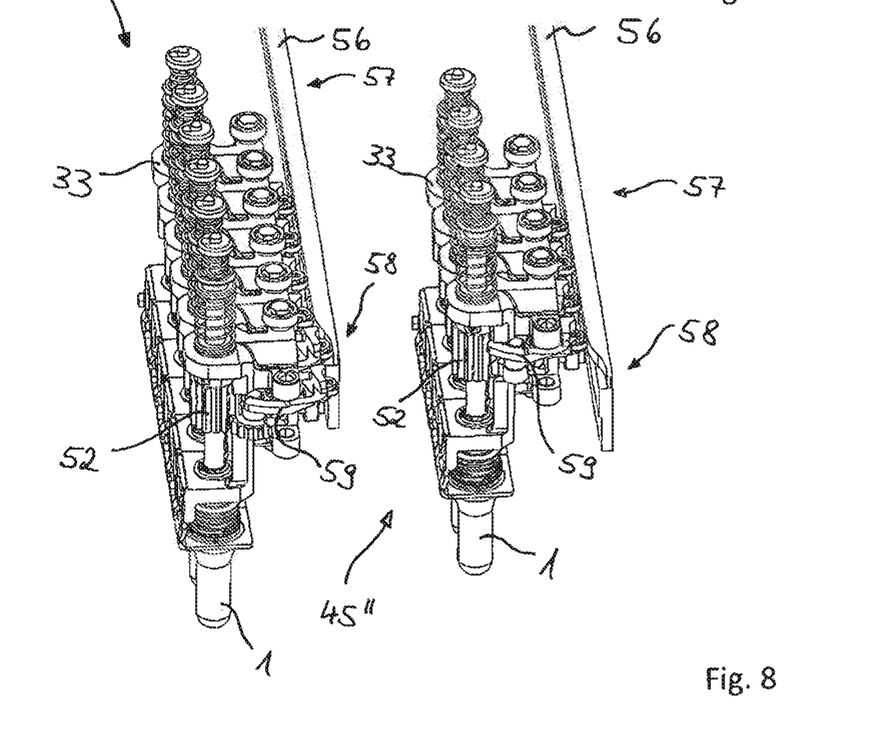

FIG. 8 shows a further particularization of a second engaging device (45"). This engaging device (45") consists of multiple engaging elements (63), which are designed under cam control by an external control cam (56). In a first region (57) of this control cam (56) the engaging elements (63) are out of engagement with the gear wheel (52) of the transport mandrel (33). In a second region (58) of the control cam (56), a swivel lever (59) is activated, which has an internal toothing (60) and which drives a pinion gear (61). Details on this will be better seen in FIG. 9. In particular, one may see there that this pinion (61) sits on a common shaft (62) with a belt pulley segment (63). The swivel movement of the swivel lever (59) results in a rotating of the pinion (61). The rotating of the pinion (61) is shared by the belt pulley segment (63). In the first region (57) of the control cam (56), this belt pulley segment (63) is out of engagement with the gear wheel (52) of the transport mandrel (33). In the second region (58), the control cam (56) swivels the swivel lever (59), thereby turning the pinion (61) and in this way the belt pulley segment (63) is brought into engagement with the gear wheel (52) of the transport mandrel? (33). Maintaining this position has the result that the gear wheel (52) is held stationary and the transport mandrel (33) with the preform (1) held on it is held rotationally fixed.

Figure 9:
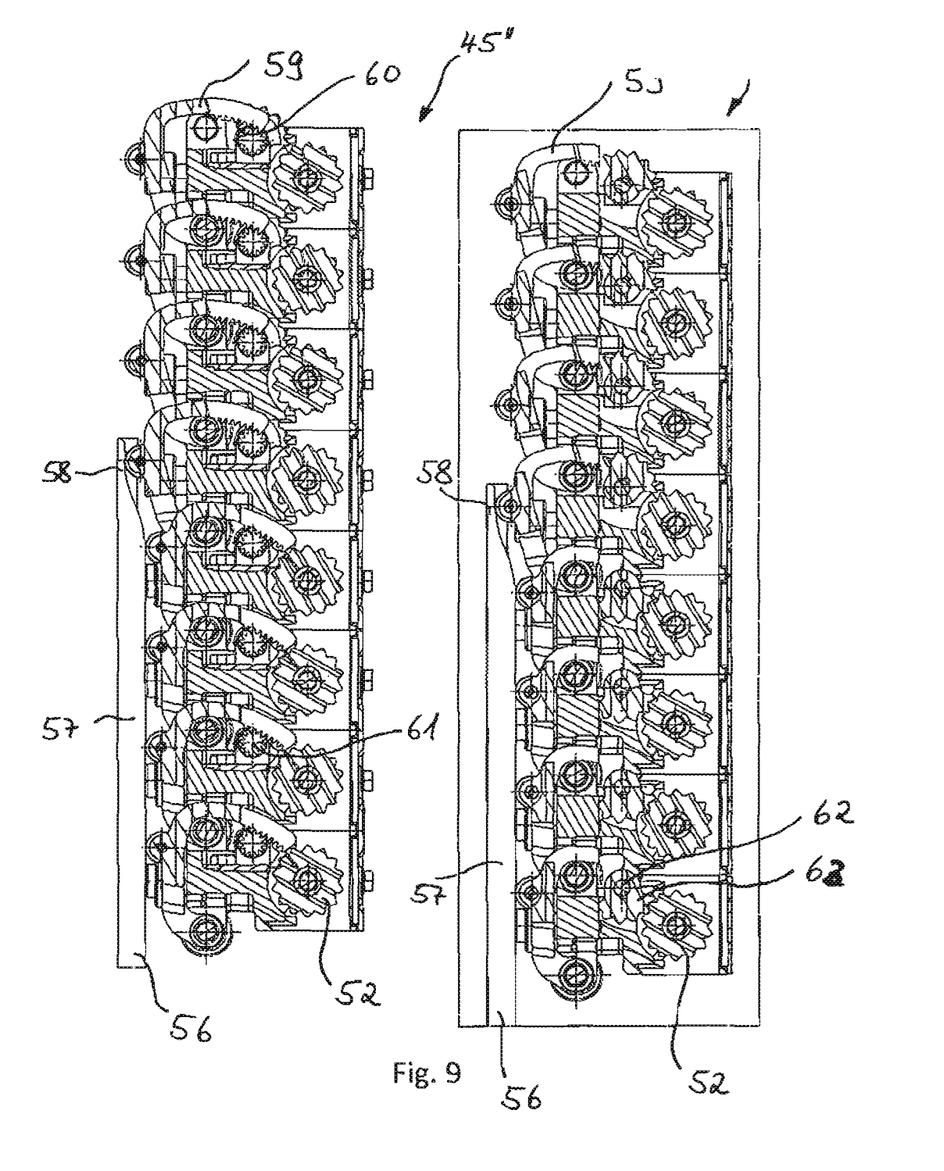

This design furthermore makes it possible to not only hold rotationally fixed the transport mandrel (33) and the preform (1) held on it, but also to turn it specifically about a definite angle of rotation, namely, when the swivel movement of the swivel lever (59) is performed such that the belt pulley segment (63) not only holds the gear wheel (52) stationary in a definite position, but also the swivel lever (59) could be pivoted more strongly, for example in a third region of the control cam (56), thereby turning the pinion (61) even further and thereby turning the belt pulley segment (63) even further, so that as a result of the intermeshing with the gear wheel (52) of the transport mandrel (33) this gear wheel (52) and hence also the transport mandrel (33) is turned about a particular angle.

The invention claimed is:

1. A heating device for thermally conditioning preforms made of a thermoplastic material for blow molding, the heating device comprising:
   a plurality of heating units arranged one behind another along a heating section; and
   transport means configured to carry the preforms on a transport path along the heating section and along the heating units;
   wherein the transport means are connected to form a closed continuous transport chain and have a rotary drive body that that is configured to engage with a first engaging device that is driven and arranged such that it circulates at a distance relative to the transport chain in order to introduce a rotational movement to the rotary drive body and to a respective one of the preforms carried by the transport means about a longitudinal axis of the transport means via engagement in the rotary drive body with the first engaging device,
   wherein the heating section comprises
   a first heating section portion provided with a first portion of the plurality of heating units for uniformly heating the preforms in a peripheral direction of the preforms, and
   a second heating section portion provided with a second portion of the plurality of heating units for non-uniformly heating the preforms in the peripheral direction,
   wherein the first engaging device is arranged in such a way that it is engaged with the rotary drive body in a region of the first heating section portion and is not engaged with the rotary drive body in a region of the second heating section portion, and
   wherein the heating device has a second engaging device that is configured to be driven and is arranged to circulate at a distance relative to the transport chain, said second engaging device being arranged in such a way that it is engaged with the rotary drive body of the transport means in the region of the second heating section portion and has a same translation speed as the transport chain such that rotation of the respective one of the preforms carried by the transport means about the longitudinal axis is prevented.

2. The heating device as claimed in claim 1, wherein the second engaging device has at least one coupling element, which is configured to travel for a coupling motion in coupling engagement with the transport means.

3. The heating device as claimed in claim 2, wherein the coupling element of the second engaging device is configured to travel for the coupling motion under cam control.

4. The heating device as claimed in claim 1, wherein the transport means are configured as transport mandrels.

5. The heating device as claimed in claim 4, wherein the transport mandrels are configured as clamping mandrels insertable into a mouth section of the preforms.

6. The heating device as claimed in claim 1, wherein the rotary drive body is configured as a gear wheel and the first engaging device is configured as a toothed belt.

7. The heating device as claimed in claim 6, wherein the second engaging device is a circulating engaging chain with multiple chain links in a row, wherein each chain link has an engaging body configured to move into an engagement position with a rotary drive body.

8. The heating device as claimed in claim 7, wherein the engaging chain consists of two chain units spaced apart in a vertical direction and coupled in movement, between which the first engaging element is led away from the transport chain.

9. The heating device as claimed in claim 7, wherein the engaging body is a movable swivel lever with internal toothing, wherein the swivel lever is configured to drive a belt pulley meshing with the rotary drive body, wherein the belt pulley is configured as a disk segment, and wherein the drive of the belt pulley comes via a pinion driven by the swivel lever), which is arranged on a common shaft with the belt pulley.

10. The heating device as claimed in claim 7, wherein the engaging body is configured to move into the engagement position under cam control, or wherein the second engaging device has at least one coupling element, which is configured to travel for a coupling motion in coupling engagement with the transport means under cam control.

11. The heating device as claimed in claim 1, wherein the transport chain is led by means of spaced apart deflecting wheels to form curved circulating sections in an area of the deflecting wheels, wherein the transport chain forms linear circulating sections in areas lying in between the spaced apart deflecting wheels, and wherein the heating units are arranged in the linear circulating sections.

12. The heating device as claimed in claim 1, wherein the second engaging device is configured as a toothed belt.

13. The heating device as claimed in claim 12, wherein the second engaging device is arranged in a linear circulating section.

14. The heating device as claimed in claim 12, wherein the toothed belt forming the second engaging device is led by a guide element for a partial circumference along a deflecting wheel of the transport chain standing in engagement with the rotary drive body.

15. The heating device as claimed in claim 14, wherein the guide element is movable.

16. The heating device as claimed in claim 1, wherein engagement of the second engaging device is cam controlled.

17. A blow molding machine comprising a heating device according to claim 1.

18. A method for thermally conditioning preforms made of a thermoplastic material for a blow molding, said method comprising heating the preforms in a heating device according to claim 1 such that the preforms are heated in a non-uniform manner in peripheral regions of the preforms in the second heating section portion.

19. The method as claimed in claim 18, wherein the second engaging device rotates the preform by at a predetermined angle relative to a longitudinal axis of the preform after a stopping of the rotary drive body and before releasing engagement with the rotary drive body.

20. The method as claimed in claim 18, wherein the predetermined angle is adjustable.

* * * * *

UNITED STATES PATENT AND TRADEMARK OFFICE
CERTIFICATE OF CORRECTION

| | | |
|---|---|---|
| PATENT NO. | : 10,549,472 B2 | Page 1 of 1 |
| APPLICATION NO. | : 16/092031 | |
| DATED | : February 4, 2020 | |
| INVENTOR(S) | : Dieter Klatt et al. | |

It is certified that error appears in the above-identified patent and that said Letters Patent is hereby corrected as shown below:

On the Title Page

In item (72) Inventors:, add:
"Michael Linke, Hamburg (DE); Martin Gerhards, Hamburg (DE); Günther Godau, Hamburg (DE)"

Signed and Sealed this
First Day of June, 2021

Drew Hirshfeld
*Performing the Functions and Duties of the*
*Under Secretary of Commerce for Intellectual Property and*
*Director of the United States Patent and Trademark Office*